US011100622B2

(12) United States Patent
Hamada et al.

(10) Patent No.: US 11,100,622 B2
(45) Date of Patent: Aug. 24, 2021

(54) IMAGE PROCESSING DEVICE, IMAGE PROCESSING PROGRAM AND IMAGE PROCESSING METHOD, AND IMAGE TRANSMISSION/RECEPTION SYSTEM AND IMAGE TRANSMISSION/RECEPTION METHOD

(71) Applicant: Kripton Co., Ltd., Tokyo (JP)

(72) Inventors: Masahisa Hamada, Tokyo (JP); Eiji Sakae, Tokyo (JP)

(73) Assignee: KRIPTON CO., LTD., Tokyo (JP)

( * ) Notice: Subject to any disclaimer, the term of this patent is extended or adjusted under 35 U.S.C. 154(b) by 229 days.

(21) Appl. No.: 16/094,742

(22) PCT Filed: Feb. 24, 2017

(86) PCT No.: PCT/JP2017/007192
§ 371 (c)(1),
(2) Date: May 17, 2019

(87) PCT Pub. No.: WO2017/183297
PCT Pub. Date: Oct. 26, 2017

(65) Prior Publication Data
US 2019/0295230 A1  Sep. 26, 2019

(30) Foreign Application Priority Data

Apr. 21, 2016 (JP) .............................. JP2016-085560

(51) Int. Cl.
*G06K 9/40* (2006.01)
*G06T 5/20* (2006.01)
(Continued)

(52) U.S. Cl.
CPC .................. *G06T 5/20* (2013.01); *G06T 5/00* (2013.01); *G06T 5/001* (2013.01); *H04N 1/409* (2013.01)

(58) Field of Classification Search
CPC ....... G06T 7/55; G06T 3/0006; G06T 3/0056; G06T 5/00; G06T 7/44; G06T 2211/424; G06T 9/4628
See application file for complete search history.

(56) References Cited

U.S. PATENT DOCUMENTS 6,154,574 A * 11/2000 Paik .................. G06T 5/003
250/201.2
7,308,154 B1 * 12/2007 Ferrante ............... G06K 9/0063
382/254
(Continued)

FOREIGN PATENT DOCUMENTS

JP 2010-61541 A 3/2010

OTHER PUBLICATIONS

Banham et al., "Digital image restoration," *IEEE Signal Processing Magazine* 14(2):24-41, 1997.

*Primary Examiner* — Guillermo M Rivera-Martinez
(74) *Attorney, Agent, or Firm* — Seed IP Law Group LLP

(57) ABSTRACT

The image processing device comprises: a filter coefficient storage means in which a filter coefficient is stored; a means for executing filtering processing to subject input image data to filtering and generate a first image data; a means for executing convolution processing to use the filter coefficient stored by the filter coefficient storage means, carry out convolution calculations on the first image data, and generate a second image data; a means for executing division processing to divide the first image data by the second image data to produce a third image data; and means for executing multiplication processing to multiply the first image data by the third image data to produce an output image data.

10 Claims, 8 Drawing Sheets

(51) Int. Cl.
  *G06T 5/00* (2006.01)
  *H04N 1/409* (2006.01)

(56) References Cited

U.S. PATENT DOCUMENTS

| | | | | |
|---|---|---|---|---|
| 2008/0266413 | A1* | 10/2008 | Cohen | G06T 5/20 |
| | | | | 348/222.1 |
| 2010/0061651 | A1* | 3/2010 | Mishima | G06T 5/20 |
| | | | | 382/265 |
| 2011/0274370 | A1* | 11/2011 | Kondo | G06T 3/4053 |
| | | | | 382/284 |
| 2012/0250998 | A1* | 10/2012 | Mitsunaga | G06T 5/002 |
| | | | | 382/171 |
| 2014/0139705 | A1* | 5/2014 | Ebe | H04N 5/217 |
| | | | | 348/234 |
| 2014/0160325 | A1* | 6/2014 | Hirai | G06T 5/20 |
| | | | | 348/252 |
| 2015/0097993 | A1* | 4/2015 | Oniki | G06T 5/50 |
| | | | | 348/241 |
| 2017/0193643 | A1* | 7/2017 | Naruse | H04N 5/232 |

* cited by examiner (a) (b)

(c)

(b)

(a)

IMAGE PROCESSING DEVICE, IMAGE PROCESSING PROGRAM AND IMAGE PROCESSING METHOD, AND IMAGE TRANSMISSION/RECEPTION SYSTEM AND IMAGE TRANSMISSION/RECEPTION METHOD

TECHNICAL FIELD

The present invention relates to an image processing device, an image processing program, and an image processing method.

BACKGROUND ART

A method employing a generalized inverse filter, the Richardson-Lucy method (referred to hereafter as the "RL method"), and so on are known as conventional image restoration techniques for restoring degraded images (Non-Patent Document 1). In these methods, it is assumed that the degradation process is known, and the restored image to be achieved is determined so as to minimize a square error between an input image and an image that has been degraded by the degradation process.

A generalized inverse filter calculates an inverse matrix through the solution of the conditions required to minimize the square error. As is, the calculation is often difficult, and therefore the discrete Fourier transform is implemented in order to perform the calculation in a frequency domain, whereupon the calculation result is transformed back to the real domain. This is dependent on the inverse matrix calculation in the frequency domain being division. In the RL method, a restored image having a minimum square error is acquired using an iterative method so as to gradually converge on a true solution from an initial solution.

In Patent Document 1, a method of executing the calculation in each of a plurality of local regions of a degraded image, using filter coefficients corresponding to the local regions, is proposed with the aim of reducing a processing amount when restoring the degraded image.

CITATION LIST

Patent Document

Patent Document 1: Patent Publication JP-A-2010-61541

Non-Patent Document

Non-Patent Document 1: M. R. Banham and A. K. Katsaggelos, "Digital Image Restoration", IEEE Signal Processing Magazine, pp. 24-41, 1997

SUMMARY

Technical Problem

With the conventional techniques described above, however, an increase in the calculation amount is unavoidable.

The present invention has been designed in consideration of these circumstances, and an object thereof is to provide an image processing device, an image processing program, and an image processing method with which a calculation amount can be reduced.

Solution to Problem

An image processing device according to an aspect of the present invention includes filter coefficient storing means storing a filter coefficient, means for executing filtering processing to generate first image data by performing filtering on input image data, means for executing convolution processing to generate second image data by performing a convolution calculation on the first image data using the filter coefficient stored in the filter coefficient storing means, means for executing division processing to generate third image data by dividing the first image data by the second image data, and means for executing multiplication processing to generate output image data by multiplying the third image data by the first image data.

The image processing device described above further includes means for executing the convolution processing, the division processing, and the multiplication processing repeatedly.

Further, in the image processing device described above, the filter storing means stores a plurality of filter coefficients, and the means for executing the convolution processing uses a different filter coefficient, among the plurality of filter coefficients, each time the convolution processing is executed thereby.

Furthermore, an image processing program according to another aspect of the present invention causes a computer to execute the steps of: executing filtering processing to generate first image data by performing filtering on input image data; executing convolution processing to generate second image data by reading a filter coefficient stored in a filter coefficient storage unit and performing a convolution calculation on the first image data; executing division processing to generate third image data by dividing the first image data by the second image data; and executing multiplication processing to generate output image data by multiplying the third image data by the first image data.

Moreover, an image processing method according to a further aspect of the present invention includes the steps of: executing filtering processing to generate first image data by performing filtering on input image data; executing convolution processing to generate second image data by reading a filter coefficient stored in a filter coefficient storage unit and performing a convolution calculation on the first image data; executing division processing to generate third image data by dividing the first image data by the second image data; and executing multiplication processing to generate output image data by multiplying the third image data by the first image data.

Advantageous Effects of Invention

According to the present invention, optimal image processing can be performed, and as a result, an image having a higher resolution can be acquired and the calculation amount can be reduced.

DESCRIPTION OF EMBODIMENTS

Embodiments of the present invention will be described below with reference to the figures.

Figure 1:
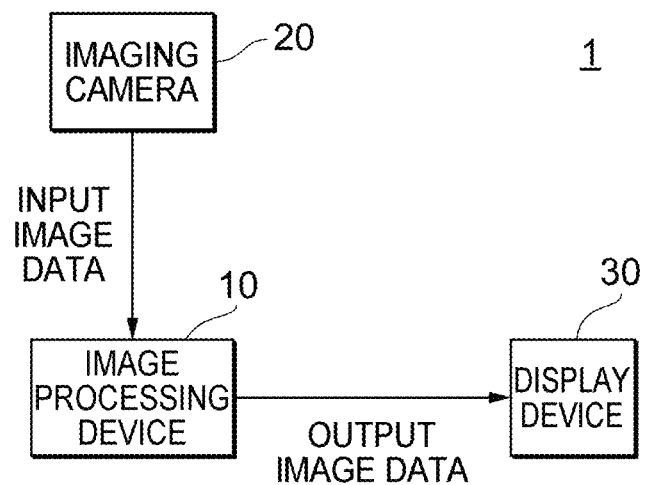
FIG. 1 is a schematic view of an image processing system 1 according to an embodiment of the present invention.

FIG. 1 is a schematic view showing an image processing system 1 according to an embodiment of the present invention. The image processing system 1 includes an image processing device 10, an imaging camera 20, and a display device 30. The imaging camera 20 generates input image data representing a captured image of a predetermined imaging subject and transmits the generated data to the image processing device 10. The image processing device 10 performs predetermined processing on the input image data received from the imaging camera 20 and transmits output image data to the display device 30. The display device 30 displays a predetermined image on the basis of the output image data received from the image processing device 10.

Figure 2:
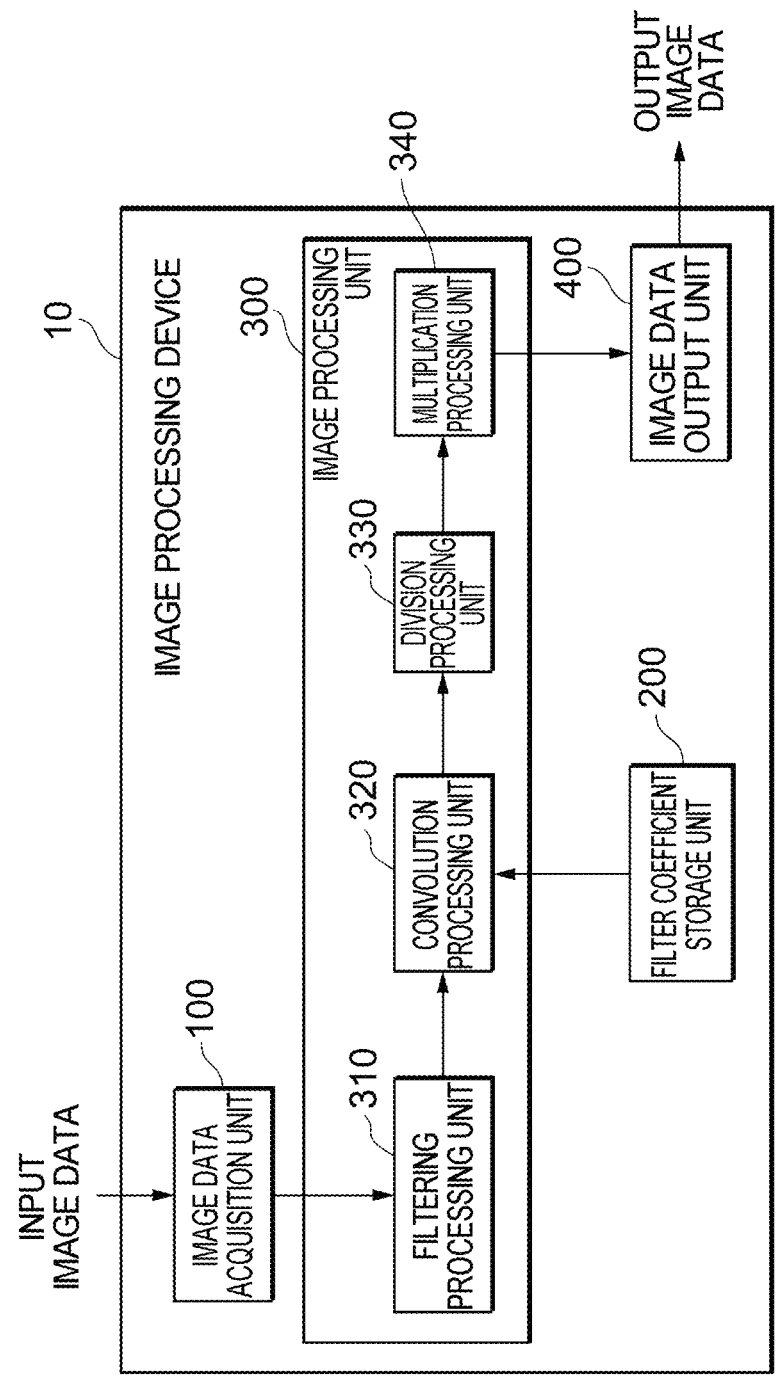
FIG. 2 is a conceptual diagram of an image processing device 10 according to a first embodiment.

FIG. 2 is a conceptual diagram of the image processing device 10 according to a first embodiment. The image processing device 10 includes an image data acquisition unit 100, a filter coefficient storage unit 200, an image processing unit 300, and an image data output unit 400. Note that the image processing device 10 may further include means provided in a normal image processing device, such as night vision correcting means, in addition to the configurations/functions described in the respective embodiments.

The image data acquisition unit 100 acquires image data acquired by turning a predetermined image into digital data. The image data acquisition unit 100 may download the image data from a medium such as a CD-ROM or a DVD, or may acquire the image data via a USB cable, Wi-Fi, the Internet, a broadcasting network, and so on, for example. Further, the image data acquisition unit 100 is not limited to means for acquiring image data from the outside of the image processing device 10, and instead, the image data acquisition unit 100 itself may be constituted by imaging means such as a camera.

The filter coefficient storage unit 200 stores a point spread filter coefficient (referred to hereafter as a "PSF coefficient"), which serves as an example of a filter coefficient, for each pixel of the input image data to be subjected to image processing. Note that the PSF coefficients may be, for example, estimated from optical system parameters, experiments, and so on, or predetermined coefficients may be set in advance. The PSF coefficients corresponding to the respective pixels may be configured such that a plurality of patterns of coefficient values are stored for each pixel.

The image processing unit 300 includes a filtering processing unit 310, a convolution processing unit 320, a division processing unit 330, and a multiplication processing unit 340. The image processing unit 300 performs predetermined processing on the input image data, thereby generating the output image data. The respective configurations included in the image processing unit 300 will be described in detail below.

The image data output unit 400 outputs the output image data. The image data output unit 400 may, for example, write the image data to a medium such as a CD-ROM or a DVD, or may output the image data to a USB cable, Wi-Fi, the Internet, a broadcasting network, and so on. Further, the image data output unit 400 is not limited to means for outputting image data to the outside of the image processing device 10, and instead, the image data output unit 400 itself may be constituted by image display means such as a monitor.

Next, the image processing performed by the image processing device 10 will be described briefly.

First, the image data acquisition unit 100 acquires input image data G (x, y) and transmits the acquired data to the filtering processing unit 310. Here, G (x, y) is a pixel value relating to a brightness at coordinates (x, y) indicating the position of a point within the input image data. In the input image data, the coordinates (x, y) may include a plurality of types of pixel values relating to color and so on as well as brightness, but in this case, a similar description to the above applies.

The filtering processing unit 310 generates first image data $A_k$ (x, y) by performing blurring processing on the input image data G (x, y). As the blurring processing, the filtering processing unit 310 may execute filtering processing using a well-known filter such as a Gaussian filter, or may read the PSF coefficients from the filter coefficient storage unit 200 and execute filtering processing using the PSF coefficients. By executing this filtering processing, the input image data are smoothed, and as a result, an increase in noise caused by subsequent processing can be suppressed.

An arithmetic expression of the processing performed by the filtering processing unit 310 is shown in formula (1). Note that $S_k$ (i, j) denotes a filter function.

$$A_k(x,y)=G(x,y)*S(i,j) \qquad (1)$$

Note that the image data acquisition unit 100 may transmit the input image data G (x, y) directly to the convolution processing unit 320. In this case, the first image data $A_k$ (x, y) are the input image data G (x, y). Whether to have the image data acquisition unit 100 transmit the input image data G (x, y) to the filtering processing unit 310 or to the convolution processing unit 320 may be selected as appropriate in accordance with a predetermined determination condition.

The convolution processing unit 320 generates second image data $B_k$ (x, y) by reading the PSF coefficient $P_k$ (i, j) stored in the filter coefficient storage unit 200 and executing a convolution calculation using the PSF coefficient on the first image data $A_k$ (x, y). In other words, the convolution processing unit 320 generates the second image data by performing a type of filtering on the first image data.

An arithmetic expression of the processing performed by the convolution processing unit 320 is shown in formula (2).

$$B_k(x,y)=A_k(x,y)*P_k(i,j) \qquad (2)$$

The division processing unit 330 generates third image data $C_k$ (x, y) by dividing the first image data $A_k$(x, y) by the second image data $B_k$ (x, y). In other words, the division processing unit 330 generates third image data representing a ratio of the first image data to the second image data for each pixel. This ratio correlates to each pixel value of the original first image data, and therefore parts of the first image data corresponding to edges, for example, have different ratios to other parts.

An arithmetic expression of the processing performed by the division processing unit 330 is shown in formula (3).

$$C_k(x, y) = A_k(x, y)/B_k(x, y) \quad (3)$$
$$= A_k(x, y)/(A_k(x, y) * P_k(i, j))$$

The multiplication processing unit 340 generates output image data $F_k$ (x, y) by multiplying the third image data $C_k$ (x, y) by the first image data $A_k$ (x, y).

An arithmetic expression of the processing performed by the multiplication processing unit 340 is shown in formula (4).

$$F_k(x, y) = A_k(x, y) \times C_k(x, y) \quad (4)$$
$$= A_k(x, y) \times (A_k(x, y)/(A_k(x, y) * P_k(i, j)))$$

The output image data $F_k$ (x, y) generated by the multiplication processing unit 340 are transmitted to the image data output unit 400 and output thereby.

Note that in the processing described above, parallel processing may be executed as appropriate using a plurality of processing lines, and processing such as bit shifting may also be executed as appropriate.

Next, a second embodiment of the image processing device 10 will be described. Note that from the second embodiment onward, description of elements included in the first embodiment will be omitted, and only points that differ from the first embodiment will be described. In particular, similar actions and effects brought about by similar configurations will not be described repeatedly in each embodiment.

Figure 3:
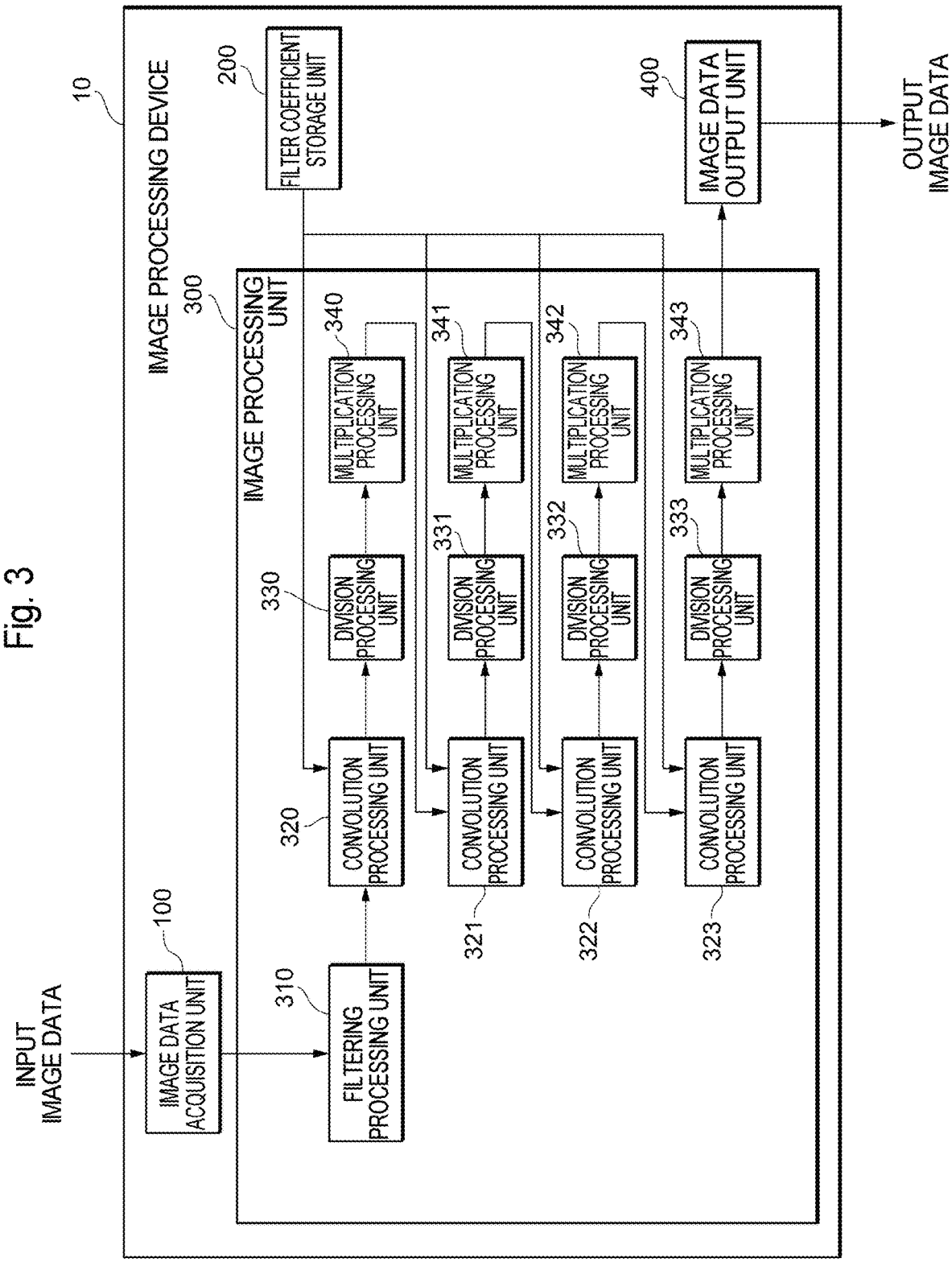
FIG. 3 is a conceptual diagram of the image processing device 10 according to a second embodiment.

FIG. 3 is a conceptual diagram of the image processing device 10 according to the second embodiment. The image processing unit 300 of the image processing device 10 includes, in addition to the filtering processing unit 310, convolution processing units 320 to 323, division processing units 330 to 333, and multiplication processing units 340 to 343. In other words, a feature of the second embodiment of the present invention is that the convolution processing, division processing, and multiplication processing of the first embodiment are executed repeatedly. More specifically, the second embodiment is configured such that the convolution processing unit, the division processing unit, and the multiplication processing unit of the first embodiment are connected in series in a plurality of stages.

Note that in the second embodiment, the convolution processing, division processing, and multiplication processing are connected in series in four stages, but this is merely an example, and the respective processing units may be connected in a desired number of stages. Moreover, the processing that is executed repeatedly is not limited to the convolution processing, division processing, and multiplication processing, and other processing, including the filtering processing, may also be executed repeatedly as appropriate.

In the image processing device 10, the filtering processing unit 310 executes filtering processing on the input image data input therein. Next, the convolution processing unit 320, the division processing unit 330, and the multiplication processing unit 340 execute processing on the image data subjected to filtering processing by the filtering processing unit 310. The image data generated by the multiplication processing unit 340 are then transmitted to the convolution processing unit 321, whereupon the convolution processing unit 321, the division unit 331, and the multiplication unit 341 respectively execute processing thereon. In the second embodiment, the processing is executed four times, whereupon the output image data generated by the multiplication processing unit 343 are transmitted to the image data output unit 400.

Next, a third embodiment of the image processing device 10 will be described.

Figure 4:
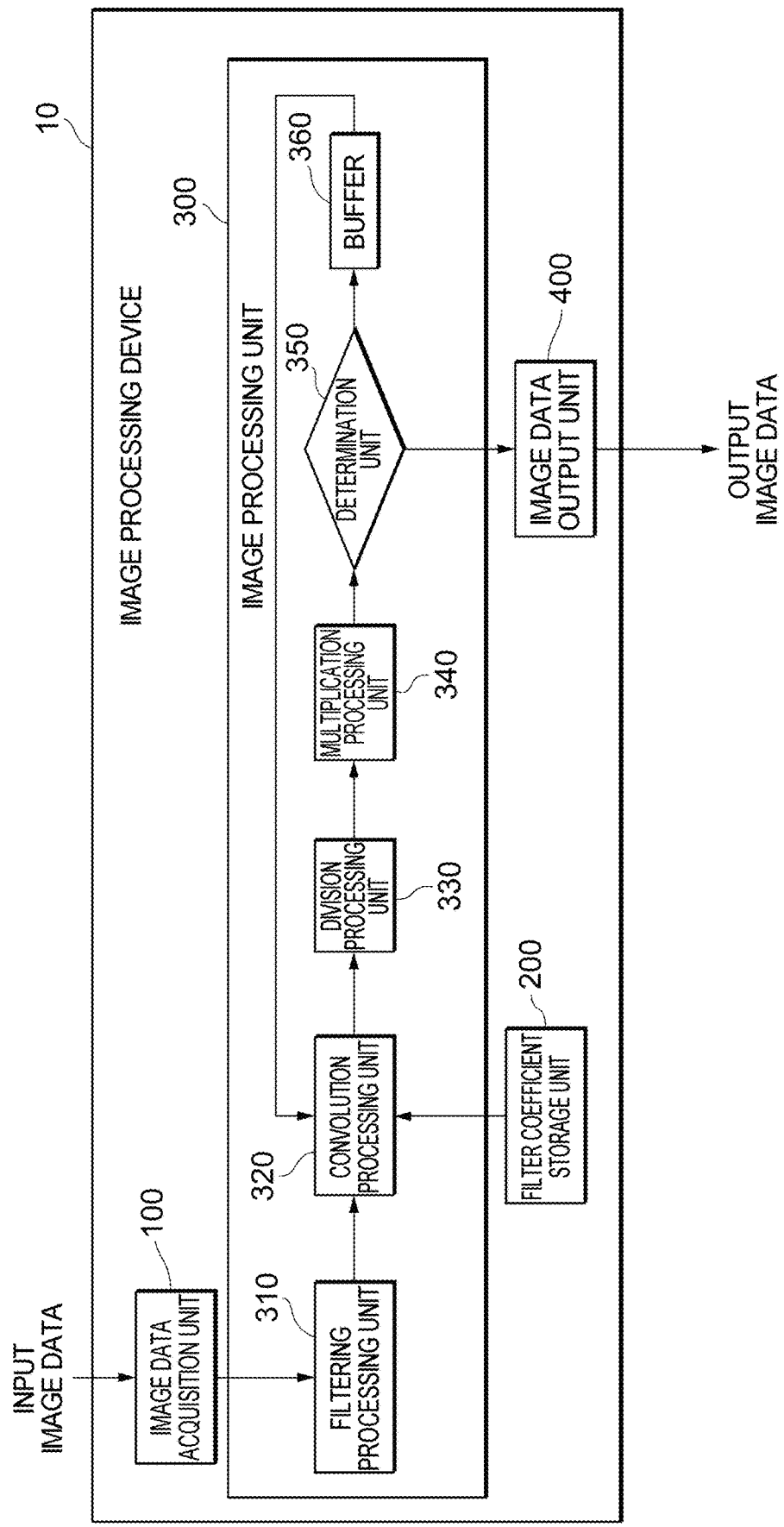
FIG. 4 is a conceptual diagram of the image processing device 10 according to a third embodiment.

FIG. 4 is a conceptual diagram of the image processing device 10 according to the third embodiment. The image processing device 10 includes, in addition to the filtering processing unit 310, the convolution processing unit 320, the division processing unit 330, and the multiplication processing unit 340. The image processing device 10 further includes a determination unit 350 and a buffer 360. A feature of the third embodiment is that the convolution processing, division processing, and multiplication processing of the first embodiment are executed repeatedly. More specifically, the third embodiment is configured such that the convolution processing unit, the division processing unit, and the multiplication processing unit of the first embodiment are connected in a loop.

In the image processing device 10, the filtering processing unit 310 executes filtering processing on the input image data input therein. Next, the convolution processing unit 320, the division processing unit 330, and the multiplication processing unit 340 execute processing on the image data subjected to filtering processing by the filtering processing unit 310. The determination unit 350 then determines whether or not iterative processing by the convolution processing unit 320, the division processing unit 330, and the multiplication processing unit 340 has been performed a predetermined number of times. When a predetermined number of iterations has not yet been reached, the image data generated by the multiplication processing unit 340 are stored in the buffer 360. The convolution processing unit 320, the division processing unit 330, and the multiplication processing unit 340 then respectively execute further processing on the image data stored in the buffer 360. When the predetermined number of iterations is reached, the image data generated by the multiplication processing unit 340 are transmitted to the image data output unit 400 as the output image data.

When a series arrangement is employed, as in the second embodiment, there is no need to provide a buffer, and therefore processing for writing data to the buffer and reading data from the buffer is unnecessary, leading to an increase in processing speed. Conversely, when iterative processing is employed, as in the third embodiment, a reduction in circuit scale can be achieved.

In the second and third embodiments, different configurations are employed, as described above, but identical calculations are executed. More specifically, in the second and third embodiments, the processing shown in formulae (2) to (4) is executed repeatedly, but as indicated by formula (5), the image data $F_k$ (x, y) generated by the multiplication processing unit during $k^{th}$ processing becomes $A_{k+1}$ (x, y), which serves as the input of $k+1^{th}$ processing by the convolution processing unit, and therefore $F_k$ (x, y) and $F_{k+1}$ (x, y) are related as indicated by formula (6).

$$A_{k+1}(x,y) = F_k(x,y) \quad (5)$$

$$F_{k+1}(x,y) = F_k(x,y) \times (F_k(x,y)/(F_k(x,y) * P_{k+1}(i,j))) \quad (6)$$

Note that the filter coefficient storage unit 200 may store a plurality of patterns of PSF coefficient values for each pixel, and in this case, during the iterative processing described above, different PSF coefficients, among a plurality of patterns of PSF coefficient values, are used each time the convolution processing is executed.

Exemplary embodiments of the image processing device 10 were described above. The first embodiment includes filter coefficient storing means storing a filter coefficient, means for executing filtering processing to generate first image data by performing filtering on input image data, means for executing convolution processing to generate second image data by performing a convolution calculation on the first image data using the filter coefficient stored in the filter coefficient storing means, means for executing division processing to generate third image data by dividing the first image data by the second image data, and means for executing multiplication processing to generate output image data by multiplying the third image data by the first image data. Thus, optimum image processing can be performed, and as a result, an image having a higher resolution can be acquired and the calculation amount can be reduced.

The second and third embodiments further include means for executing the convolution processing, division processing, and multiplication processing repeatedly. As a result, the resolution of the image can be improved even further.

Next, example applications of the image processing device 10 according to the first to third embodiments will be described.

Figure 5:
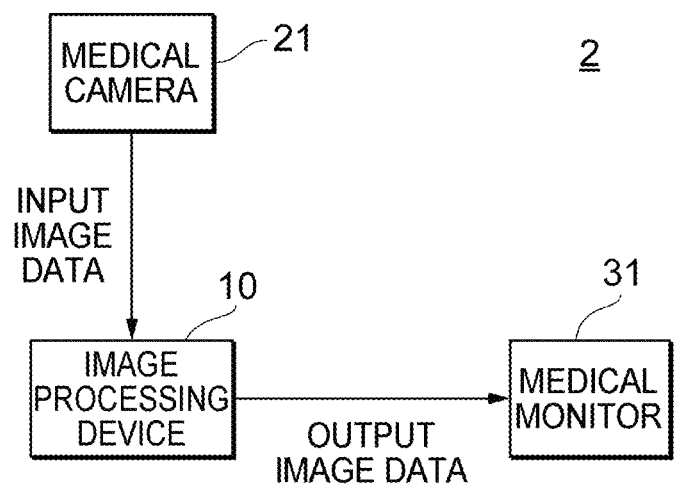
FIG. 5 is a conceptual diagram of a medical video processing system 2 to which the image processing device 10 is applied.

FIG. 5 is a conceptual diagram of a medical video processing system 2 to which the image processing device 10 is applied. The medical video processing system 2 includes the image processing device 10, a medical camera 21, and a medical monitor 31. Here, the medical camera 21 is an endoscope camera or the like, for example. The image processing device 10 processes input image data input therein from the medical camera 21, and outputs the processed data to the medical monitor 31. The medical monitor 31 outputs video or the like required by doctors while implementing medical practices such as operations.

By applying the image processing device 10 to a video processing system for medical video, such as the medical video processing system 2, doctors can view the condition of an affected part and tissue on the periphery thereof more accurately. In particular, when an extremely small camera such as an endoscope is used as the medical camera 21, there is a fixed limit on performance elements, such as the resolution, of the camera. Hence, when the image processing device 10 is applied to this system and an output image acquired by improving the resolution of the input image is generated, even more remarkable effects are realized. Moreover, by applying the image processing device 10, real time video processing that does not affect the implementation of medical practices such as operations can be realized.

Figure 6:
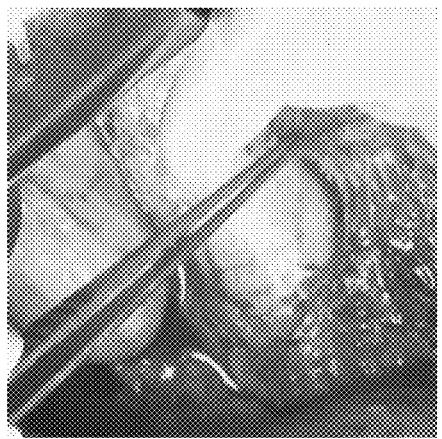
FIG. 6 shows an image prior to image processing by the medical video processing system 2 and a frequency spectrum thereof.
Figure 6:
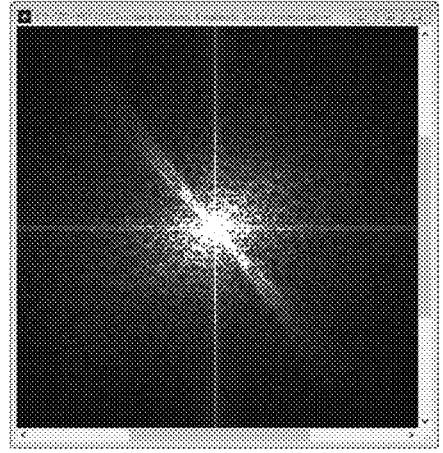
Figure 7:
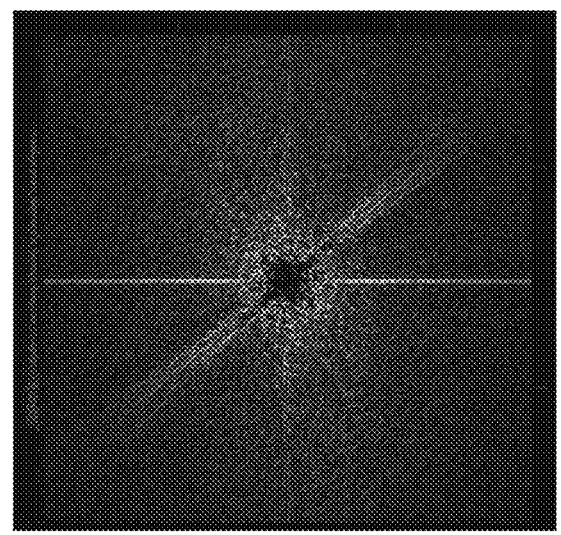
FIG. 7 shows an image following image processing by the medical video processing system 2 and the frequency spectrum thereof.
Figure 7:
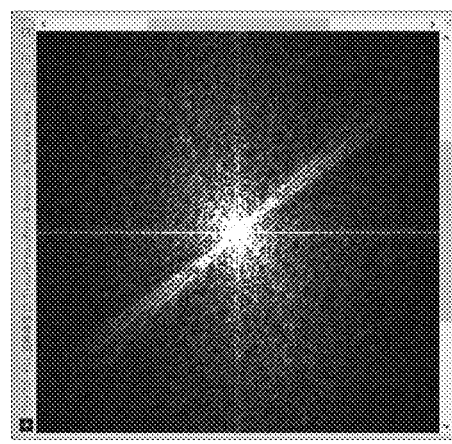
Figure 7:
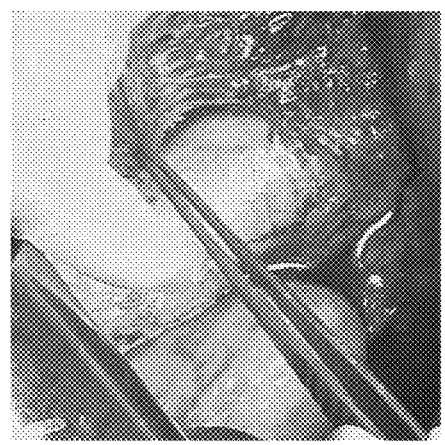

FIGS. 6 and 7 are views illustrating the effects of the image processing device 10. FIG. 6(a) shows an image prior to image processing by the medical video processing system 2, and FIG. 6(b) is a view showing a two-dimensional frequency spectrum thereof. Further, FIG. 7(a) shows an image following image processing by the medical video processing system 2, and FIG. 7(b) is a view showing a two-dimensional frequency spectrum thereof. FIG. 7(c) is a view showing an increase in the two-dimensional frequency spectrum of FIG. 7(b) over that of FIG. 6(b). As is evident from FIG. 7(c), white spots denoting the existence and strength of frequency components are spread over a wider range after image processing is performed by the medical video processing system 2, indicating an increase in a high frequency component. In other words, it is evident that following image processing by the medical video processing system 2, the resolution increases.

Figure 8:
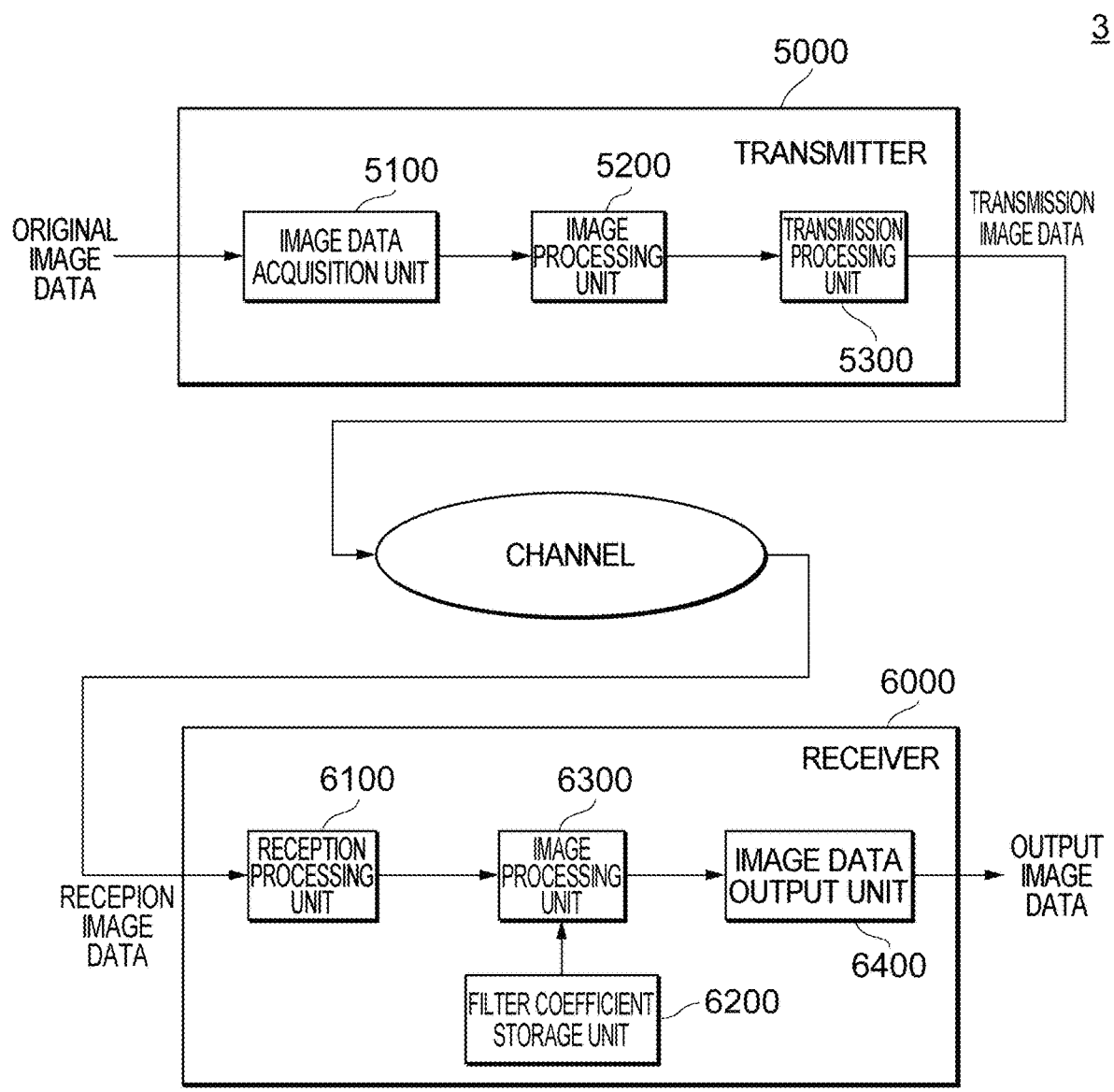
FIG. 8 is a conceptual diagram of an image transmission/reception system 3 to which the image processing device 10 is applied.

FIG. 8 is a conceptual diagram of an image transmission/reception system 3 to which the image processing device 10 is applied. In the image transmission/reception system 3, transmission image data transmitted from a transmitter 5000 are received by a receiver 6000 over a network or the like.

The transmitter 5000 includes an image data acquisition unit 5100, an image processing unit 5200, and a transmission processing unit 5300. The image data acquisition unit 5100 acquires image data generated by turning a predetermined image into digital data. The image data acquisition unit 5100 may download the image data from a medium such as a CD-ROM or a DVD, or may acquire the image data via a USB cable, Wi-Fi, the Internet, a broadcasting network, and so on, for example. Further, the image data acquisition unit 5100 is not limited to means for acquiring image data from the outside of the transmitter 5000, and instead, the image data acquisition unit 5100 itself may be constituted by imaging means such as a camera. The image processing unit 5200 includes filtering processing means, convolution processing means, and so on, for example. The transmission processing unit 5300 includes means for executing processing corresponding to a communication environment and the like.

Next, an operation of the transmitter 5000 will be described briefly. In the transmitter 5000, the image processing unit 5200 executes predetermined image processing on original image data acquired by the image data acquisition unit 5100. For example, the image processing unit 5200 executes filtering processing on the original image data so as to generate blurred image data from the original image data as the transmission image data. In the blurred image data, the high frequency component is reduced in comparison with the original image data, and therefore the data can be reduced. Instead of generating blurred image data, transmission image data having a reduced data amount may be generated from the original image data using another appropriate method. The transmission processing unit 5300 executes processing such as encryption in accordance with the communication environment and so on, and then transmits the transmission image data. Here, the communication environment (the channel) includes the Internet, a mobile communication network, Wi-Fi, a broadcasting network, communication by a cable such as a USB, data exchange via a USB memory or an external memory, and so on.

The receiver 6000 includes, for example, a reception processing unit 6100, a filter coefficient storage unit 6200, an image processing unit 6300, and an image data output unit 6400. The reception processing unit 6100 receives reception image data and executes processing such as decryption thereon in accordance with the communication environment and so on. The filter coefficient storage unit 6200 stores a filter coefficient for each pixel of the input image data to be subjected to image processing. The image processing unit 6300 includes, for example, filtering processing means, convolution processing means, division processing means, and multiplication processing means. The image data output unit 6400 outputs the output image data. The image data output unit 6400 may write the image data to a medium such as a CD-ROM or a DVD, or may output the image data to a USB cable, Wi-Fi, the Internet, a broadcasting network, and so on, for example. Further, the image data output unit 6400 is not limited to means for outputting image data to the outside of the receiver 6000, and instead, the image data output unit 6400 itself may be constituted by a monitor or the like.

Next, an operation of the receiver 6000 will be described briefly. In the receiver 6000, the reception processing unit 6100 executes processing such as decryption on the reception image data received thereby in accordance with the communication environment and so on. The image processing unit 6300 executes similar processing to that of the image processing unit 300 according to the first to third embodiments described above, for example. The image data output unit 6400 outputs the output image data.

By applying the present invention to an image transmission/reception system in this manner, the data amount of the transmission data can be reduced in the transmitter, and an optimum image can be generated/restored by the image processing executed in the receiver.

Example applications of the present invention were described above, but the present invention is not limited to these example applications, and may also be applied to a television video processing system, a surveillance camera video processing system, a telephoto image processing system, another moving image or static image processing system, and so on, for example.

The embodiments described above were provided to facilitate understanding of the present invention and are not to be interpreted as limiting the present invention. The present invention may be modified/amended without departing from the spirit thereof, and equivalents of the present invention are included therein. In other words, embodiments acquired by a person skilled in the art by applying appropriate design modifications to the above embodiments are included in the scope of the present invention as long as these embodiments include the features of the present invention. For example, the respective elements of the above embodiments, as well as the arrangements, materials, conditions, shapes, sizes, and so on thereof, are not limited to the examples described above, and may be modified as appropriate. Moreover, the above embodiments are examples, and may of course be partially replaced by or combined with configurations indicated by different embodiments. These embodiments are also included in the scope of the present invention as long as the features of the present invention are included therein.

The use of the terms "device", "unit", "transmitter", "receiver", etc., in the specification denote structural elements, such as circuitry, which in operation perform the corresponding methods and functions disclosed herein.

REFERENCE SIGNS LIST

1 Image processing system
2 Medical video processing system
3 Image transmission/reception system
10 Image processing device
20 Imaging camera
21 Medical camera
30 Display device
31 Medical monitor
100 Image data acquisition unit
200 Filter coefficient storage unit
300 Image processing unit
310 Filtering processing unit
320, 321, 322, 323 Convolution processing unit
330, 331, 332, 333 Division processing unit
340, 341, 342, 343 Multiplication processing unit
350 Determination unit
360 Buffer
400 Image data output unit
5000 Transmitter
5100 Image data acquisition unit
5200 Image processing unit
5300 Transmission processing unit
6000 Receiver
6100 Reception processing unit
6200 Filter coefficient storage unit
6300 Image processing unit
6400 Image data output unit

DRAWINGS

[FIG. 1]
20 IMAGING CAMERA
INPUT IMAGE DATA
10 IMAGE PROCESSING DEVICE
OUTPUT IMAGE DATA
30 DISPLAY DEVICE
[FIG. 2]
INPUT IMAGE DATA
10 IMAGE PROCESSING DEVICE
100 IMAGE DATA ACQUISITION UNIT
300 IMAGE PROCESSING UNIT
310 FILTERING PROCESSING UNIT
320 CONVOLUTION PROCESSING UNIT
330 DIVISION PROCESSING UNIT
340 MULTIPLICATION PROCESSING UNIT
200 FILTER COEFFICIENT STORAGE UNIT
400 IMAGE DATA OUTPUT UNIT
OUTPUT IMAGE DATA
[FIG. 3]
INPUT IMAGE DATA
10 IMAGE PROCESSING DEVICE
100 IMAGE DATA ACQUISITION UNIT
300 IMAGE PROCESSING UNIT
310 FILTERING PROCESSING UNIT
320, 321, 322, 323 CONVOLUTION PROCESSING UNIT
330, 331, 332, 333 DIVISION PROCESSING UNIT
340, 341, 342, 343 MULTIPLICATION PROCESSING UNIT
200 FILTER COEFFICIENT STORAGE UNIT
400 IMAGE DATA OUTPUT UNIT
OUTPUT IMAGE DATA
[FIG. 4] INPUT IMAGE DATA IMAGE PROCESSING DEVICE
100 IMAGE DATA ACQUISITION UNIT
300 IMAGE PROCESSING UNIT
310 FILTERING PROCESSING UNIT
320 CONVOLUTION PROCESSING UNIT
330 DIVISION PROCESSING UNIT
340 MULTIPLICATION PROCESSING UNIT
350 DETERMINATION UNIT
360 BUFFER
200 FILTER COEFFICIENT STORAGE UNIT
400 IMAGE DATA OUTPUT UNIT
OUTPUT IMAGE DATA
[FIG. 5]
21 MEDICAL CAMERA
INPUT IMAGE DATA
10 IMAGE PROCESSING DEVICE
OUTPUT IMAGE DATA
31 MEDICAL MONITOR
[FIG. 8]
5000 TRANSMITTER
ORIGINAL IMAGE DATA
5100 IMAGE DATA ACQUISITION UNIT
5200, 6300 IMAGE PROCESSING UNIT
5300 TRANSMISSION PROCESSING UNIT
TRANSMISSION IMAGE DATA
CHANNEL

6000 RECEIVER
RECEPTION IMAGE DATA
6100 RECEPTION PROCESSING UNIT
6200 FILTER COEFFICIENT STORAGE UNIT
6400 IMAGE DATA OUTPUT UNIT OUTPUT IMAGE DATA

What is claimed is:

1. An image processing device comprising:
filter coefficient storing means storing a point spread filter coefficient for each pixel;
means for executing blurring processing to generate first image data by performing blurring on input image data;
means for executing convolution processing to generate second image data by performing a convolution calculation on the first image data using the point spread filter coefficient stored in the filter coefficient storing means;
means for executing division processing to generate third image data by dividing the first image data by the second image data; and
means for executing multiplication processing to generate output image data by multiplying the third image data by the first image data.

2. The image processing device according to claim 1, further comprising:
means for executing the convolution processing, the division processing, and the multiplication processing repeatedly.

3. The image processing device according to claim 2, wherein
the filter storing means stores a plurality of point spread filter coefficients, and
the means for executing the convolution processing uses a different point spread filter coefficient, among the plurality of filter coefficients, each time the convolution processing is executed thereby.

4. A non-transitory computer-readable medium storing an image processing program which when executed by a computer cause the computer to execute the steps of:
executing blurring processing to generate first image data by performing blurring on input image data;
executing convolution processing to generate second image data by reading a point spread filter coefficient for each pixel stored in a filter coefficient storage unit and performing a convolution calculation on the first image data;
executing division processing to generate third image data by dividing the first image data by the second image data; and
executing multiplication processing to generate output image data by multiplying the third image data by the first image data.

5. An image processing method comprising the steps of:
executing blurring processing to generate first image data by performing blurring on input image data;
executing convolution processing to generate second image data by reading a point spread filter coefficient for each pixel stored in a filter coefficient storage unit and performing a convolution calculation on the first image data;
executing division processing to generate third image data by dividing the first image data by the second image data; and
executing multiplication processing to generate output image data by multiplying the third image data by the first image data.

6. An image transmission/reception system comprising:
a transmitter for transmitting image data; and
a receiver for receiving the image data and processing the image data, wherein the transmitter includes transmission image generating means for generating transmission image data having a reduced data amount from original image data, and the receiver includes:
filter coefficient storing means storing a point spread filter coefficient;
means for executing blurring processing to generate first image data by performing blurring on input image data;
means for executing convolution processing to generate second image data by performing a convolution calculation on the first image data using the point spread filter coefficient stored in the filter coefficient storing means;
means for executing division processing to generate third image data by dividing the first image data by the second image data; and
means for executing multiplication processing to generate output image data by multiplying the third image data by the first image data.

7. An image transmission/reception method employed in an image transmission/reception system having a transmitter for transmitting image data and a receiver for receiving the image data and processing the image data, the method comprising the steps of:
the transmitter executing the step of generating transmission image data having a reduced data amount from original image data, and
the receiver executing blurring processing to generate first image data by performing blurring on input image data;
the receiver executing convolution processing to generate second image data by reading a point spread filter coefficient stored in a filter coefficient storage unit and performing a convolution calculation on the first image data;
the receiver executing division processing to generate third image data by dividing the first image data by the second image data; and
the receiver executing multiplication processing to generate output image data by multiplying the third image data by the first image data.

8. An image processing device comprising:
a memory, which, in operation, stores point spread filter coefficients associated with image pixels; and
image processing circuitry coupled to the memory, wherein the image processing circuitry, in operation:
blurs input image data, generating first image data;
executes a convolution calculation on the first image data using a point spread filter coefficient stored in the memory, generating second image data;
divides the first image data by the second image data, generating third image data; and
multiplies the third image data by the first image data, generating fourth output image data.

9. The image processing device according to claim 8, comprising:
an imaging camera, which, in operation, captures the input image data.

10. The image processing device according to claim 8, wherein
the memory, in operation, stores a plurality of point spread filter coefficients;
the image processing circuitry, in operation, executes a plurality of iterations of the convolution calculations, the dividing, and the multiplying, using an output of the multiplying of a previous iteration as first image data in a current iteration;

each iteration of the plurality of iterations uses a different point spread filter coefficient in the convolution calculation of the iteration; and the image processing circuitry outputs a result of a last iteration of the plurality of iterations as an output image.

* * * * *